UNITED STATES PATENT OFFICE.

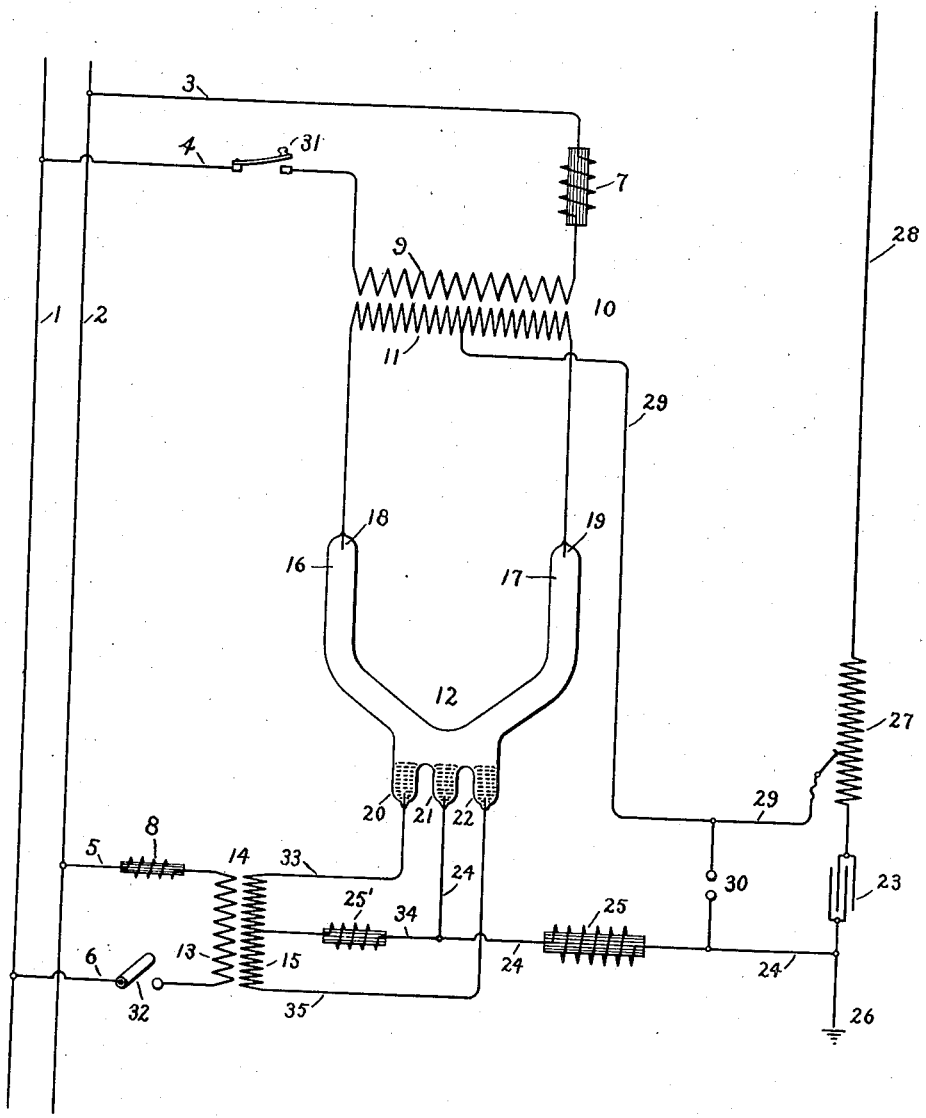

CHARLES P. STEINMETZ, OF SCHENECTADY, NEW YORK, ASSIGNOR TO GENERAL ELECTRIC COMPANY, A CORPORATION OF NEW YORK.

WIRELESS-TELEGRAPH TRANSMITTER.

No. 910,430.　　　Specification of Letters Patent.　　　Patented Jan. 19, 1909.

Application filed April 20, 1907.　Serial No. 369,262.

*To all whom it may concern:*

Be it known that I, CHARLES P. STEINMETZ, a citizen of the United States, residing at Schenectady, county of Schenectady, State of New York, have invented certain new and useful Improvements in Wireless-Telegraph Transmitters, of which the following is a specification.

My invention has reference to improvements in space telegraphy, and its object is the substitution of the use of uni-directional current of high potential in place of alternating currents heretofore used for charging the condenser which discharges through an air or spark gap, and thus produces variations of potential in an elevated conductor or antenna, which then emits electromagnetic waves which propagate through the air and are absorbed at a distant antenna, and are converted into electric currents which actuate a suitable signal producing device.

For long distance space telegraphy high potential currents of considerable volume must be employed, and it has heretofore been impracticable to use other than alternating currents for this purpose. Alternating currents, however, do not give such steady and uniform surges as are essential for the safe and reliable operation of the transmitter, and more especially has it been found that the periodicity of the discharges at the spark gap are not ordinarily maintained constant with the employment of alternating currents of such high potential and volume as are required for long distance space telegraphy. By my invention this difficulty is overcome since in accordance therewith a uni-directional current of any desired voltage is produced in the charging circuit by a primary source of alternating current of any potential, and preferably of moderate potential.

The accompanying drawing illustrates in diagram an apparatus organized in accordance with my invention.

In this drawing 1, 2, represent a transmission line of alternating currents of moderate potential from which two branches 3, 4, and 5, 6, are derived, the former containing a reactance coil 7 and the latter a reactance coil 8 for limiting the amount of current derived from the main line. The branch circuit 3, 4, contains the primary coil 9 of a step-up transformer 10, the secondary, 11, of which is connected with a mercury arc rectifier 12 in the manner hereinafter described. The branch circuit 5, 6, also contains a primary 13 of a step-up transformer 14, the secondary coil, 15, of which is also connected with the mercury arc rectifier.

The mercury arc rectifier 12 is constructed as usual of glass and is, in effect, a branched vessel, into the two main branches 16, 17, of which, the terminals 18, 19 of the secondary coil of the transformer 10 are sealed. Below the two main branches 16, 17, of the rectifier, are the three subsidiary branches 20, 21, 22, which are filled with mercury as indicated, and into each of them projects and is sealed a wire which is immersed in the mercury in these subsidiary branch tubes or pockets. The wire projecting into the central pocket 21 is connected outside of the rectifier with one armature of the condenser 23 by a conductor 24, and a reactance coil 25 is included in this conductor for a purpose which will presently appear. This same armature of the condenser is also connected to ground at 26, while with the other armature is connected a reactance coil or auto-transformer 27, preferably without an iron core, and with the elevated conductor or antenna 28. The auto-transformer is adjustably tapped at an appropriate predetermined point by a conductor 29 which extends to and is connected with the central part of the secondary winding of the transformer 10. The spark gap device 30 is in circuit shunting the condenser and a portion of the auto-transformer between the conductors 24 and 29. In the circuit 3, 4, is included a telegraph key 31 by which that circuit may be opened and closed in accordance with a telegrapher's code, in the usual manner.

The operation of the apparatus so far described is as follows:—When the key 31 is depressed to close the circuit 3, 4, alternating currents of an amount largely determined by the reactance coil 7, pass through the primary 9 of the step-up transformer 10, and the secondary currents of high potential, discharging from the secondary coil of that transformer, give uni-directional impulses in the circuit which includes the condenser. Considering the impulse discharging from the left hand end of the secondary of the transformer, it proceeds to its terminal 18, sealed in the branch 16 of the rectifier and to the mercury in the middle pocket 21, and by conductor 24, reaction coil 25, the condenser, a portion of the auto-transformer, and conductor 29, back to the central point of the secondary coil of the transformer 10. The following impulse from the secondary coil, proceeding from the right hand end of the same, reaches the terminal 19 sealed in the arm 17 of the rectifier, and through the mercury vapors in the same to the mercury in the central pocket 21, and by conductor 24, reaction coil 25, condenser, auto-transformer conductor 29, again back to the central portion of the secondary of transformer 10. Thus, the impulses which pass through the condenser are uni-directional, and they are rendered practically uniform by the current leveling reaction coil 25, which may be located in any portion of either the conductor 24 or the conductor 29. The capacity of the condenser and the inductance of that portion of the auto-transformer which is included in the discharging circuit, are so proportioned that the discharges of the condenser through the air gap at 30 will occur with the desired frequency.

In order that all of the impulses from the secondary of the transformer 10 may surely pass through the rectifier, it is necessary that the same be primed, and such priming is secured by the impulses delivered to the rectifier by the transformer 14. In the primary circuit of this transformer is a switch 32 by which that circuit is closed an instant before signals are transmitted by the operation of the key 31. The transformer 14 would ordinarily be a step-up transformer, but the rate of its transformation may be considerably lower than that of the transformer 10. The upper end of the secondary of transformer 14 is connected with the mercury cup 20 by the conductor 33; the middle portion of that secondary is connected by conductor 34 with the conductor 24 which terminates in the mercury cup 21, and the lower terminal of the secondary of transformer 14 is connected by conductor 35 with the mercury cup 22. Preferably, but not necessarily, a reaction coil 25' is included in the conductor 34, and it serves the same purpose as reaction coil 25, namely, to render the impulses delivered to the rectifier by the transformer 14 practically continuous and uniform. The operation of this priming device is well understood in the art, and it is barely necessary to say that any impulse starting from the upper terminal of the secondary coil 15 proceeds by conductor 33, mercury cup 20, through the small space between this cup and cup 21, and by conductor 34 back to the central portion of the secondary coil 15. Any impulse starting from the lower terminal of the secondary coil 15 proceeds by conductor 35 to mercury cup 22, and through the short space between this cup and cup 21, and returns by conductor 34 to the middle portion of the secondary coil 15.

What I claim as new and desire to secure by Letters Patent of the United States, is,—

1. A space-telegraph transmitter containing a sparking gap fed by a condenser, in combination with a source of alternating current, means for converting the alternating impulses into high tension uni-directional current of substantially uniform strength, and means for charging the condenser by the converted current, substantially as described.

2. A space-telegraph transmitter containing a sparking gap fed by a condenser, in combination with a source of alternating currents, a transformer and mercury arc rectifier for converting the alternating impulses into high tension uni-directional impulses, and circuit connections for charging the condenser with the rectified current, substantially as described.

3. In a space-telegraph transmitting equipment, the combination of a sparking gap fed by periodic discharges of a condenser, a transmission line carrying alternating currents of comparatively low potential, a step-up transformer charged from the line, a mercury arc rectifier receiving the discharges from the transformer and discharging into the condenser, and means for leveling the rectifier discharges, substantially as described.

4. In a space-telegraph equipment, the combination of a sparking gap fed by periodic discharges of a condenser, a transmission line carrying alternating currents of comparatively low potential, a step-up transformer charged from the line, a mercury arc rectifier receiving the discharges from the transformer and discharging into the condenser, means for leveling the rectifier discharges, an antennæ and a ground connection, and a transmitting key in the low potential circuit, substantially as described.

In witness whereof, I have hereunto set my hand this 19th day of April, 1907.

CHARLES P. STEINMETZ.

Witnesses:
  BENJAMIN B. HULL,
  HELEN ORFORD.